United States Patent
Alderson (10) Patent No.: US 7,065,625 B2
(45) Date of Patent: Jun. 20, 2006

(54) COMPUTER SYSTEM, METHOD, AND PROGRAM PRODUCT FOR PERFORMING A DATA ACCESS FROM LOW-LEVEL CODE

(75) Inventor: John Alderson, Reading (GB)

(73) Assignee: Sun Microsystems, Inc., Santa Clara, CA (US)

( * ) Notice: Subject to any disclaimer, the term of this patent is extended or adjusted under 35 U.S.C. 154(b) by 471 days.

(21) Appl. No.: 10/395,441

(22) Filed: Mar. 24, 2003

(65) Prior Publication Data

US 2003/0212874 A1 Nov. 13, 2003

(30) Foreign Application Priority Data

May 9, 2002 (GB) .................................. 0210661.5

(51) Int. Cl.
*G06F 12/00* (2006.01)
(52) U.S. Cl. ...................... 711/170; 711/201; 711/207; 711/220
(58) Field of Classification Search ...................... None
See application file for complete search history.

(56) References Cited

U.S. PATENT DOCUMENTS

| | | | |
|---|---|---|---|
| 5,537,576 A | 7/1996 | Perets et al. | |
| 5,899,994 A * | 5/1999 | Mohamed et al. | 707/100 |
| 6,286,088 B1 | 9/2001 | Campbell et al. | |
| 6,349,355 B1 * | 2/2002 | Draves et al. | 711/6 |
| 6,446,182 B1 | 9/2002 | Bouraoui et al. | |
| 6,553,477 B1 * | 4/2003 | Krishna et al. | 711/207 |

OTHER PUBLICATIONS

International search report application No. GB0220661.5 mailed Nov. 28, 2002.
*Solaris™ Internals—Core Kernel Architecture*, Mauro, et al, Prentice Hall, Sun Microsystems, Inc., Palo Alta, CA, 2001, pp. 31-37, ISBN 0-13-022496-0.

* cited by examiner

*Primary Examiner*—Kevin Verbrugge
(74) *Attorney, Agent, or Firm*—Meyertons Hood Kivlin Kowert & Goetzel, P.C.; B. Noël Kivlin (57) ABSTRACT

A computer system includes a register that is configured to contain a zero value. In response to a predetermined occurrence on the computer system, such as a hardware interrupt, the computer system launches a trap routine. This routine generates output data that needs to be stored within the memory space of the computer system. In order to write out this data from within the trap routine, a desired target address is specified as a negative offset from the zero value stored in the register. This avoids the need to have to locate another (unused) register in which to store the write address.

44 Claims, 5 Drawing Sheets

COMPUTER SYSTEM, METHOD, AND PROGRAM PRODUCT FOR PERFORMING A DATA ACCESS FROM LOW-LEVEL CODE

FIELD OF THE INVENTION

The present invention relates to a computer system, and in particular to a method for performing a data access from low-level code, such as a trap routine, running on the computer system.

BACKGROUND OF THE INVENTION

Many modern operating systems are built around a kernel, which provides a core set of functionality and services to allow programs to run on the computer hardware. The kernel includes code routines for handling traps. The operating system invokes such a routine (known as a trap routine) if an event occurs that is in some way unexpected or unanticipated.

There are a relatively wide variety of circumstances that can lead to a trap routine being called. One example is a page fault, when a process attempts to access a virtual address, and the memory management unit (MMU) does not currently contain a mapping from this virtual address to a real physical memory location. This can occur if there is not enough room within the MMU, more particularly the translation lookaside buffer (TLB), to store the relevant mapping. In this case, the correct mapping must be retrieved into the TLB, in order to provide the desired association between the requested virtual address and the corresponding physical memory location. Alternatively, a page fault may arise when a requested virtual address does not lie within any mapped region (this of course will normally lead to program error).

Another circumstance in which a trap can be generated is where there is some instruction error detected by a processor. Examples of this situation would be an attempt to divide by zero, or to execute an instruction requiring a higher privilege level than possessed by the relevant process.

The above two classes of traps can be regarded as synchronous, in that they occur in the course of normal program flow. On the other hand, many traps can also be generated asynchronously. Typically these are initiated by some form of hardware interrupt. For example, such an interrupt may be used to indicate that the user has hit a key on a computer terminal; that a disk unit has successfully retrieved some requested data; or that another processor in a multi-processing system has made some form of request. A further form of asynchronous event that can invoke trap code is the receipt of a data communication from an external source, such as a packet over a network.

A computing system often has to handle a very high rate of traps, given the wide range of situations in which they can arise. For example, a processor in a typical server may receive thousands of trap events per second. It will be recognised therefore that the performance of trap code can be highly significant for the overall performance of the machine. Note that this impact is both direct, as programs have to wait for trap routines to complete, and also indirect, as trap routines consume machine resources that could otherwise be employed by other programs.

Trap routines are therefore normally written in assembly code for the machine on which they are to be run in order to maximise speed. In addition, this allows low-level operations to be performed directly with the hardware, which can be necessary given the purpose of a trap routine, for example to process interrupts.

It is also very important that trap routines behave correctly. This is not only because, as low level code, trap routines bypass many of the safeguards that are provided for normal programs, but also because they run in kernel space, and so have relatively high privileges. It will be appreciated therefore that a misbehaving trap routine can easily cause the complete system to crash, and potentially result in the loss of data as well.

In view of the above, understanding the operation of a trap routine is very important, both to ensure correct behaviour, and also for performance reasons (to see if there is any way in which the overall speed of the trap routine can be improved). A typical way to do this is to instrument the code. Such instrumentation enables the recording of various state values within the code for subsequent analysis, in order to get a clearer understanding of the operation of the code. This can then assist with both defect correction and also performance analysis and optimisation (these activities will be collectively referred to herein as debugging).

For programs in a higher level language, a common way to instrument code is simply to include output statements in various locations. These can then be used to print or save to disk the values of selected variables during the running of a program. However, the instrumentation of trap code is a rather more challenging proposition. Thus there are normally significant constraints imposed on trap code regarding the nature of operations that can be performed within a trap routine. This helps to reduce the likelihood of problems arising from execution of the trap routine itself. Thus should an attempt to write data lead inadvertently to another trap routine being called, this may only further exacerbate the situation.

(Note that it is not normally possible to avoid entirely nested trap routines, i.e. where one trap routine triggers another. Nevertheless, it is generally desirable to try to minimise the occurrence of such nesting in order to avoid certain problems, such will be described in more detail below).

Many systems therefore do not support the instrumentation of trap code via simple write statements. Rather, it is known to provide a special-purpose macro that can be used instead to output data from trap code. However, a complication can arise here, in that many processors require the output address for a write operation to be stored in a register. This restriction is particularly true in reduced instruction set computing (RISC) system, since RISC processors tend to have relatively short-length instructions. In such circumstances, there is no room to incorporate the output address for a write or store instruction into the instruction itself, hence the need for this to be available to the processor in a register instead. (In contrast, in some complex instruction set computing (CISC) processors, the instructions can be much longer, and so are able to directly incorporate the address for a particular write operation). Thus for a RISC environment, or other system in which output addresses must be stored within a register, it is necessary to find a free register to store an output address before a write operation can be performed.

It is known to provide a processor with registers for use by trap code. The primary reason for this is that when trap code is initiated, the previous processing state must be saved, since the invocation of the trap routine necessitates a change of processing direction compared with the immediately preceding instructions. In general therefore, the processor has to save the state of the process that was executing immediately prior to receipt of the trapped event. This then allows the process to be safely restored after the trap routine has completed.

It will be appreciated that this is analogous to a function call, where the state of the calling function is saved on the program stack when the function is invoked. Thus the program stack maintains state information when dropping from a first program function into a second program function. This ensures that when the second program function has completed, the first function can be revived in its correct state (as of the time the second function was initiated). A program stack can typically save a whole series of states, thereby allowing function calls to be nested one within the other.

In theory the main program stack could also be used for saving state on entry into trap routines. However, this turns out to be rather unattractive for performance reasons. This is because a conventional stack facility may save more context than is needed for the execution of a simpler trap routine. Moreover, use of the stack may trigger further traps, for instance when the expansion of a stack across a page-boundary itself causes a page-fault trap. Consequently, trap routines typically try to use the registers mentioned above for storing state information to allow the previous program state to be restored at the end of the trap code. The use of such registers rather than the program stack by the processor helps to ensure that the trap-code executes quickly.

However, the situation becomes more complicated where one trap gets called from within another trap (i.e. trap nesting). An example of this is where a trap routine needs to access a particular virtual address that is not currently mapped in the TLB, since this then results in another trap. Thus a hierarchical set of trap routines can be invoked, in analogous fashion to the stacked function calls mentioned above. This can lead to a situation where the nesting or processing involved is too complex to be accommodated by the registers available to the processor. In such circumstances, the use of the program stack to store state data becomes inevitable.

Returning now to the instrumentation of trap code, it will be recalled that in a RISC environment and on certain other machines, a write operation requires the relevant output address to be stored in a register. In fact, the instrumentation macro for a trap routine typically utilises a circular buffer in memory for outputting data, and this then needs two free registers in order to operate properly: one for storing the base location of the buffer, and one for storing the current write location within the buffer (i.e. corresponding to its fill level).

In theory, the registers available to the processor for storing state information during trap routines might serve such a purpose (i.e. storing one or more output addresses). However, this is problematic, because it is difficult to know with certainty whether or not a particular register is free. Rather, a register accessible to a trap routine may already be being used to store state information for nested trap routines or from the previously executing program. Thus any attempt to store an output address in a register may inadvertently overwrite important state information for preceding code, and thereby prevent proper operation of the system once the trap routine has completed.

Of course, the instrumentation code could try to force the trap routines to utilise the program stack for saving their state information, since this would then free up the registers to store output addresses. However, it is highly undesirable for instrumentation to have such a major impact on code under investigation, since this can easily lead to a significant divergence between the behaviour of the instrumented code and of the non-instrumented code. This in turn can prevent proper understanding and analysis of the non-instrumented code, and so undermine the very purpose of the instrumentation itself.

SUMMARY OF THE INVENTION

Accordingly, in one embodiment of the invention there is provided a method for operating a computer system. The computer system has a memory divided into pages, with an address space starting at zero, and also has a register configured to contain a zero value. The method commences with allocating a region of memory at the top of the address space, and then locking this allocation for the page or pages corresponding to this region in a translation lookaside buffer. Subsequently, a data access is performed from within low-level code running on the computer system to an address in the allocated region of memory. This address is specified as a negative offset from the zero value stored in the register.

A typical situation where such an approach can be applied arises where the low-level code comprises a trap routine, and it is desired to instrument this routine. This would normally require at least one free register to function as a pointer to an area where the instrumentation output is to be stored. This has previously prevented insertion of instrumentation at arbitrary points in the trap routine code, without the need for extra (and risky) effort to make available the desired register. Indeed, standard trap instrumentation typically requires two registers to operate a circular buffer for output, thereby exacerbating the problem.

In contrast, the approach described herein allows such a RISC processor to reliably and efficiently address a region of memory without altering the contents of any program-visible register. This is particularly valuable for RISC processors that have very limited facilities for addressing via immediate data (i.e. they generally require that the write address for a store operation is made available to a processor in a register). It is also of great benefit for contexts such as trap handling, where very few assumptions can be made about register and memory availability.

Thus the allocated memory region provides an area where data from trap instrumentation or any other appropriate source can be directed. No general register is required to achieve this, only a single register that is configured to store a zero value. Note that such a register, restricted to zero, is already typically provided in RISC systems. Addresses within the allocation region can then be accessed by using a negative offset from this zero register, since this offset in effect results in a wraparound of the address to the top portion of memory. Typically this can be expressed as $X'=M+X$, where X is the offset (a negative value), M is the total size of the address space, and $X'$ is the address in the top portion of memory that corresponds to X.

Note that if a positive offset were used from the zero register instead of a negative offset, then the corresponding region of memory would include page zero. This would be undesirable, since many systems prevent access to page zero as a way of detecting uninitialised pointers, typically by having page zero explicitly unmapped (indeed, many of the traps that may need to be investigated or instrumented originate from page zero accesses).

The allocation of the page or pages in the memory region are locked in a translation lookaside buffer (TLB) in order to ensure that their mappings to the corresponding physical memory locations are always available. This helps to ensure that accessing the allocated region does not result in any (secondary) traps.

In one embodiment, the size of the allocated region of memory is determined by the maximum allowable offset supported by the system for a data access instruction. Normally this a property of a processor instruction set, and so will generally be the same for all processors in a given multiprocessor system. In one particular implementation, the offset is limited to 12 bits, corresponding to 4 kbytes, which in turn represents half a page in the most common configuration of this implementation. Such a region provides ample space for most purposes, while at the same time tying down only a single entry in the TLB.

In one embodiment, the allocated region of memory is used for directly storing output from trap instrumentation and other low-level code as and when required, thereby avoiding any risk of altering register state. In another embodiment, further flexibility may be obtained by using the allocated region to save initial values from at least two registers. This then allows these registers to be used to define a circular buffer or any other desired memory structure for use by the low-level code (it will be appreciated that such a memory structure does not have to be within the allocated region, but could be at any other suitably available location in the address space). Once the low-level code has completed, the initial values of the registers can be then restored from the saved values in the allocated memory region to allow the system to continue processing as before. In this context, the allocated region has served in effect as a fast register stash, without the complexity or overhead of having to generate a stack frame.

The allocated region of memory can also be used for other purposes, by other forms of low-level code. For example, in a multiple CPU system it is common to store status information about the CPUs in a series of records, one record per CPU. A given CPU can then perform a special-purpose hardware lookup to find out which CPU in the system it is, and can then determine the address of the relevant record containing its own status information.

In one embodiment of the present invention, the allocated region for each CPU is used for storing information particular to that CPU, such as the address of the record having status data for that CPU. This then allows the status information to be accessed directly and quickly, avoiding the need for any hardware lookup and subsequent conversion of the CPU identity into the address of the relevant record. Such a performance benefit can potentially more than compensate for a single locked entry in the TLB.

Typically there is one allocated region of memory for each CPU. The low-level code in performing a data access therefore runs on just one of the CPUs, in order to ensure that the same allocated region is consistently accessed by that particular portion of low-level code.

In accordance with another embodiment of the invention, there is provided a computer system having a memory divided into pages and with an address space starting at zero. The computer system also has a register configured to contain a zero value. The computer system further comprises a region of memory at the top of the address space, and a translation lookaside buffer that supports a lock on the allocation of the page or pages corresponding to this region. Low-level code running on the computer system is operable to perform a data access to an address in the allocated region of memory. This address is specified as a negative offset from the zero value stored in the register.

In accordance with another embodiment of the invention, there is provided a computer program product comprising a medium containing machine readable program instructions for loading into a computer system. The computer system has a memory divided into pages and an address space starting at zero. The computer system further includes a register configured to contain a zero value. The program instructions cause the computer to perform the steps of: allocating a region of memory at the top of the address space; locking the page or pages corresponding to the allocated region in a translation lookaside buffer; and performing a data access from within low-level code running on the computer system to an address in the allocated region of memory. In performing this data access, the address is specified as a negative offset from the zero value stored in the register.

In such a computer program product, the computer program instructions may be recorded or embedded on a storage medium, such as a CD ROM, tape, DVD and so on.

It will be appreciated that the system and computer program product embodiments of the invention will generally benefit from the same particular features as the method embodiment of the invention.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 1:
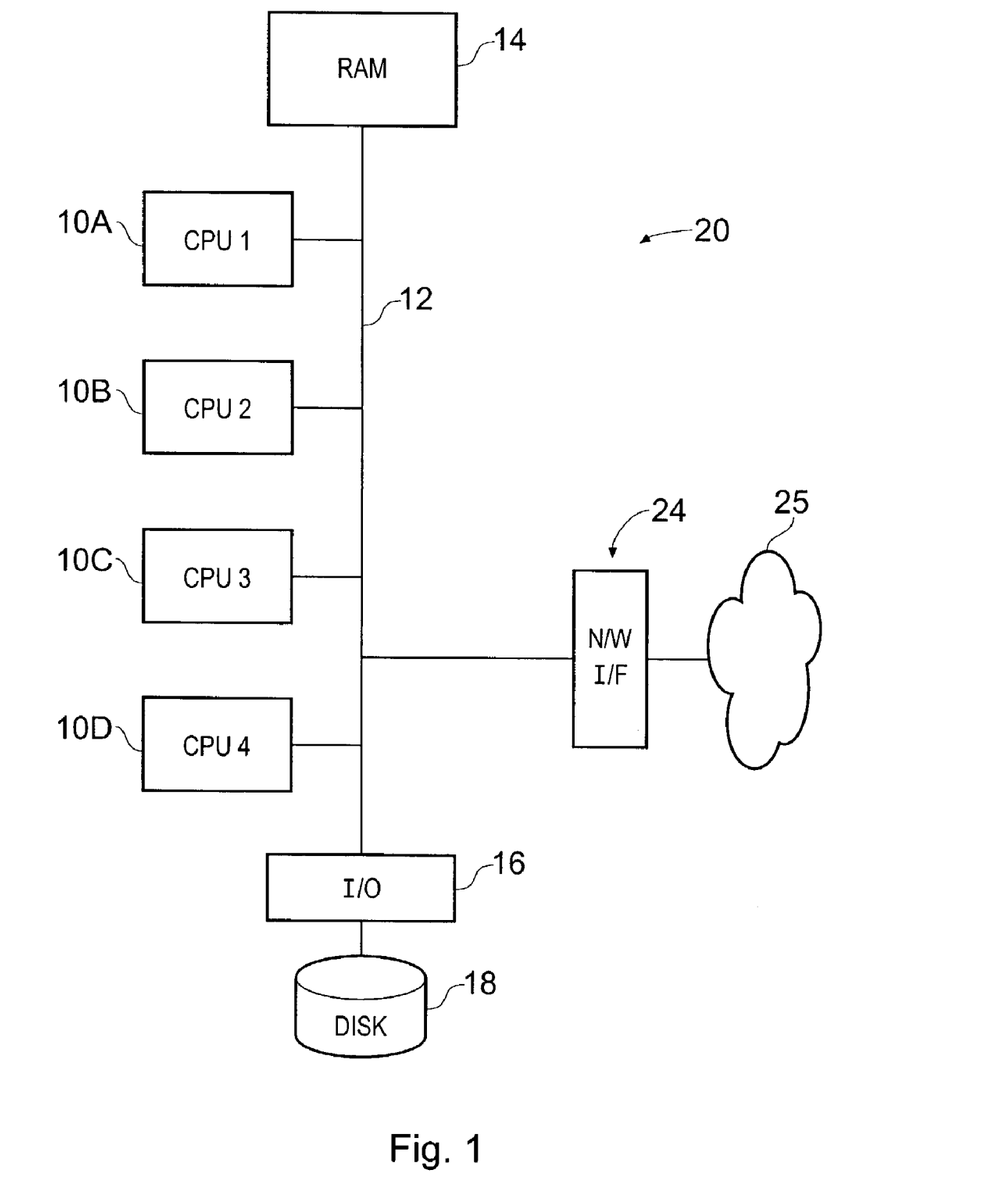
FIG. 1 is a schematic diagram illustrating a typical computer installation in which the present invention may be implemented.

FIG. 1 is a simplified schematic diagram of a multi-processor system 20 in accordance with one embodiment of the present invention. System 20 includes four CPUs 10A, B, C and D (although of course more or fewer CPUs may be included in other embodiments). Each of these includes a processor (such as a SPARC processor from Sun Microsystems Inc), together with associated registers, cache memory, and other components (not shown in FIG. 1). The CPUs 10 are interconnected by bus 12, which also links them to shared physical memory, RAM 14. This is shared in the sense that generally any CPU can access any particular piece of RAM. The CPUs 10 are also attached via interface 16 to external disk storage 18. This may typically be provided by multiple disk drives, for example as arranged into a redundant array of inexpensive drives (RAID) architecture. Bus 12 is further connected to network interface 24 in order to allow system 20 to communicate via network 25.

Note that a wide variety of configurations are possible for CPUs 10, bus 12, and memory 14. For example, a certain portion of RAM may be more closely associated with a particular CPU in order to provide faster access for this CPU to that portion of memory than to the rest of memory. This is known as a non-uniform memory architecture (NUMA). In addition, in many systems bus 12 is implemented as a hierarchy of buses, with the fastest links between CPUs 10 and RAM 14, and somewhat slower links to other components, including external storage 18 and network interface 24. Alternatively, bus 12 may be replaced partially or completely by a switching network. Furthermore, system 20 will typically include many other components not shown in FIG. 1, such as a ROM, a control terminal, a power supply and so on. The skilled person will be familiar with a very wide range of possible architectures and configurations, and it will be appreciated that the present invention is not limited to any particular system arrangement.

Figure 1A:
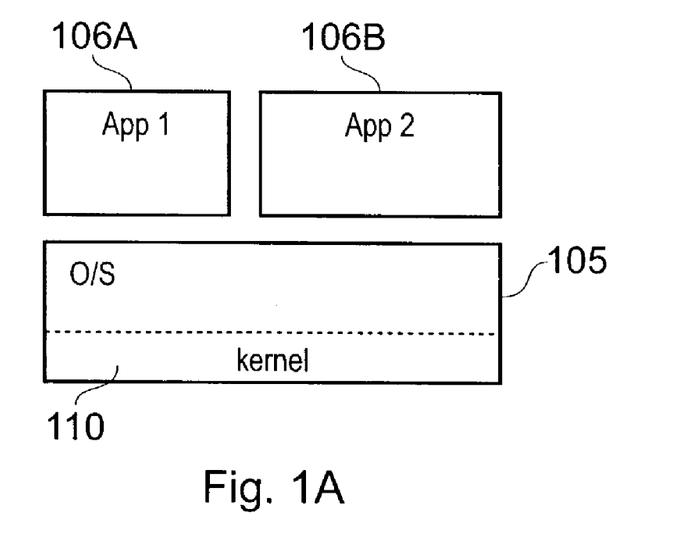
FIG. 1A is a simplified schematic diagram illustrating the software architecture of the system of FIG. 1.

FIG. 1A illustrates in simplified form the main software components running on a CPU 10 from system 20. These comprise an operating system 105, and one more applications 106A, 106B. At the heart of the operating system 105 is the kernel 110, which provides the most basic operating system functionality. System trap routines are generally incorporated into kernel 110. Note that operating system 105 is loaded into a CPU 10 from a suitable storage unit, such as disk storage 18, or from some removable storage medium, such as a tape or CD ROM, normally under the control of some boot code stored in system ROM (not shown in FIG. 1). In addition, code may be downloaded for execution by system 20 over network 25.

In one particular embodiment, operating system 105 comprises the Solaris platform, available from Sun Microsystems Inc. Further details about this operating system can be found in: "Solaris Internals: Core Kernel Components" by Jim Mauro and Richard McDougall, Prentice Hall 2001 (ISBN 0-13-022496-0), which is hereby incorporated by reference into the present application.

Figure 2:
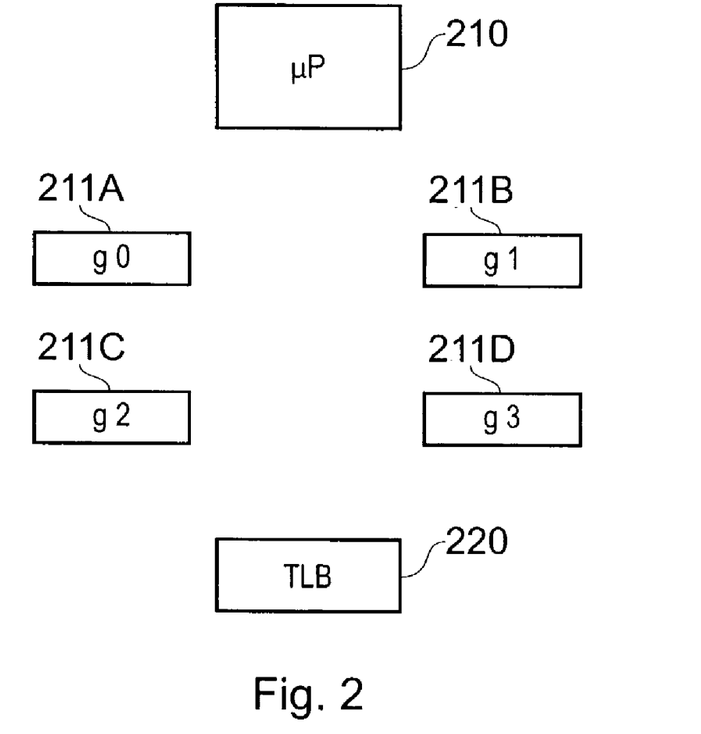
FIG. 2 is a schematic diagram illustrating a processor unit including registers from the computer installation of FIG. 1.

FIG. 2 illustrates in schematic form certain components from one of the CPUs 10 of the computer system of FIG. 1. In particular, FIG. 2 illustrates a processor 210 and four associated registers 211A, B, C and D. These registers are denoted G0, G1, G2 and G3 respectively. Register G0 is a special register, as will be described in more detail below. The remaining registers, G1–G3, can be used, for example, to store state information during the execution of trap code, as previously described.

The processor further contains translation lookaside buffer (TLB) 220. This is used to store mappings from virtual (logical) addresses into real (physical) addresses for that CPU. The TLB only has space for mappings for a relatively small proportion of memory. For example, the TLB is limited to 64 entries in one embodiment (although other systems have other sizes). TLB entries corresponding to memory pages that have not been recently used are therefore susceptible to being discarded from the TLB to make way for new entries. It is however possible to lock an entry into the TLB to ensure that it is not discarded in this manner, although this reduces the remaining available capacity of the TLB.

It will be appreciated of course that in practice a processor generally has many more components than shown in FIG. 2, for example instruction fetch facilities and so on (plus considerably more than four registers). For simplicity however, these additional registers and other components have been omitted from FIG. 2, since they are not directly relevant to an understanding of the present invention.

Register G0 is different from the remaining registers G1–G3 in that it is arranged that register G0 always stores the value of 0 (zero). Thus any load from G0 necessarily retrieves the value of 0. Conversely, any attempt to store data into G0, although regarded as a perfectly permissible operation, results, in effect, in the loss of the relevant data, in that the value of G0 remains as zero, irrespective of the value of the data that is (in theory only) being stored into the register.

Note that certain known systems already include a register having the functionality of G0. This is particularly the case for RISC systems, since providing a register such as G0 can be used to mimic certain instructions, which therefore do not need to be specifically supported (thereby reducing the size of the formal instruction set). For example, consider an operation ADD (a, b; c), where this is interpreted as an instruction to add together the values a and b, and to store the result in c. If we take register G0 as being the source of value b, then the overall effect of this operation is simply to copy the value of a into c. Accordingly, there is no need to provide a separate specific "copy" instruction.

As another example, consider an operation ORDER (a, b; c, d). Let us assume that this instruction compares the values a and b, and writes the smaller of the two out as c, and the larger of the two out as d. If, for some reason, we are only interested in the smaller value, then we can associate output d with register G0, which will therefore, in effect, discard this larger value.

Because register G0 is not used to store data per se, this opens up the possibility of using it as an output address for write operations during a trap routine. This is feasible because some systems allow a slight offset from the register value to be specified in the write command itself. In other words, the write command specifies both the register storing a base address, and then also a (small) offset to be applied to this address.

Note that in one embodiment the size of the offset supported by the processor is limited to 12 bits. Such a restriction in the offset available from the address stored in the register implies that any output address using G0 as the base address must lie at the very bottom of the memory address space. For example, in a system having an 8 kbyte page size, the offset region would be completely contained within the lowest 4 kbytes of page 0. This is problematic because many systems prevent output to this location, or more accurately, they fail to provide a valid mapping for address zero. (The primary reason for such a constraint is that it prevents access to a location specified by an uninitialised pointer—a relatively common source of programmer error).

However, rather than using a conventional positive offset from G0 in the write command, it is in fact possible to use a negative offset from G0 instead. This leads to a negative memory address. Superficially such a negative address is meaningless (for a normal address space commencing at zero). However, it turns out that due to a wraparound effect, a small negative address can be regarded as equivalent to a large positive address.

Figure 3:
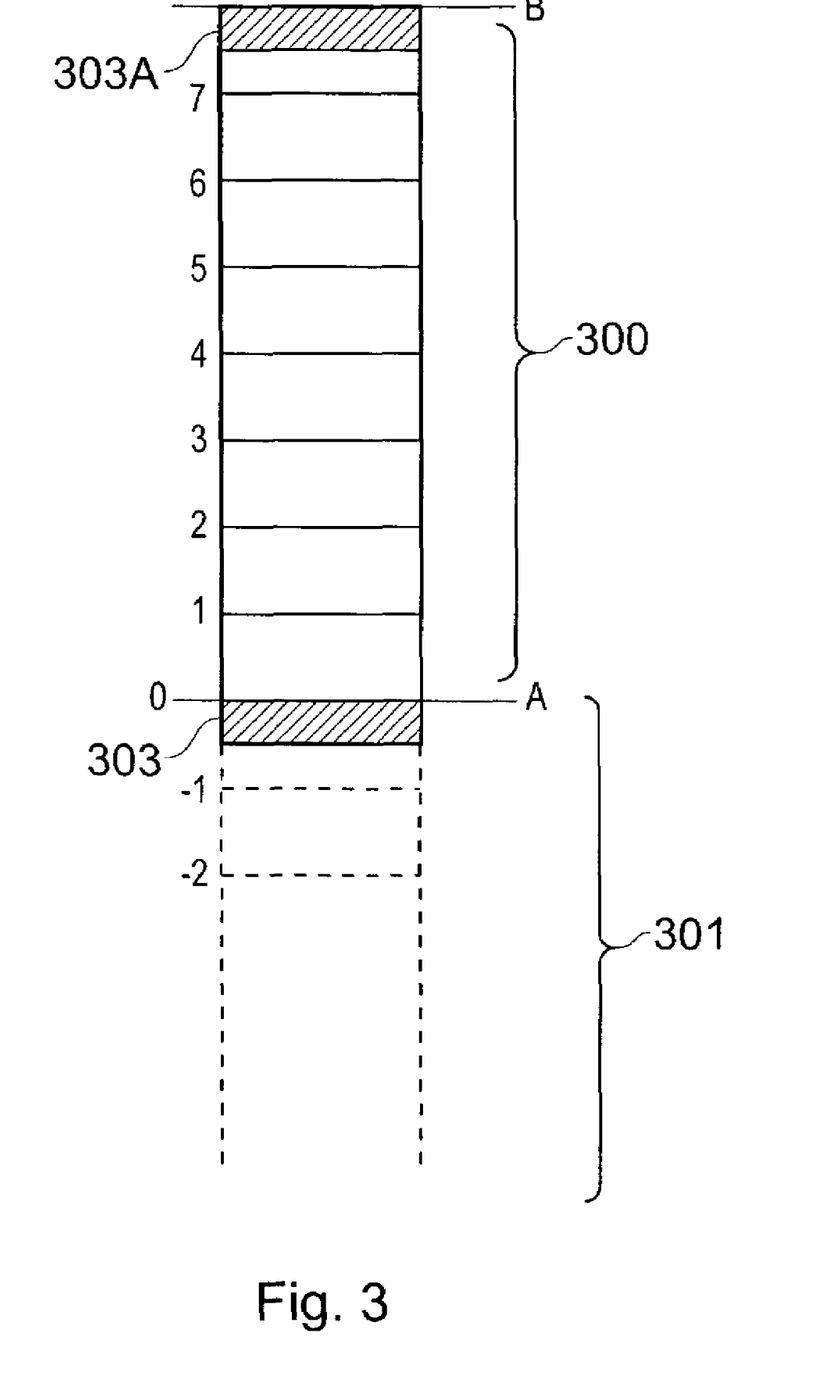
FIG. 3 is a schematic diagram illustrating the memory space of the processor unit of FIG. 2, and the interpretation of negative memory offsets.

This situation is illustrated in FIG. 3, which depicts a memory address space 300 lying between limits A and B. This address space is shown as being divided into eight pages although it will be appreciated that a practical system will have a much larger number of pages. Conceptually, we can imagine address space 300 as extending to negative values, leading to the formation of a negative memory address space. This is indicated by dashed lines in FIG. 3, and denoted by reference numeral 301.

We can map the negative memory address space onto positive memory address space by simply shifting address space 301 up by the total size of the memory address space (i.e. eight complete page units for the example shown in FIG. 3). Consequently, memory region 303, which represents a small negative offset from an address of zero, corresponds to memory region 303A, located at the top of page 7 (the topmost page of the address space).

If M is the total size of the address space 300, X the (negative) offset, and X' the location of X mapped into the main address space 300, then we can relate X' to X using the wraparound as: For $-M \leq X < 0$; $X' = X + M$. Alternatively, we can write this as: $X' = X$ Modulo(M).

It will be seen therefore that by using a small negative offset from address zero, rather than a small positive offset, the relevant memory region is shifted from the bottom of the address space all the way up to the top of the address space. An important consequence of this is that write operations are now enabled, since access to the top of the address space is not subject to the previously described limitations that apply to the bottom of the address space.

Accordingly, it is now feasible to use an output location determined by a negative offset from the G0 register as a location for storing the output of instrumented trap code. Since only register G0 is utilised, this approach avoids the risk of overwriting any important data that is stored in other registers and may be needed for correct operation of the trap routines.

As an example, in one embodiment based on a 64-bit system having an 8 kbyte page size, the topmost virtual page will have an address range from:

0x ffff ffff ffff e000 to 0x ffff ffff ffff ffff

For convenience, this can be referred to as page "minus-one". If 12 bits of negative offset are available, corresponding to 4 kbytes (i.e. half a page), then the following range is available for output:

0x ffff ffff ffff f000 to 0x ffff ffff ffff ffff

This region can be regarded as a scratchpad that is freely available for use by a trap routine to output data.

Figure 4:
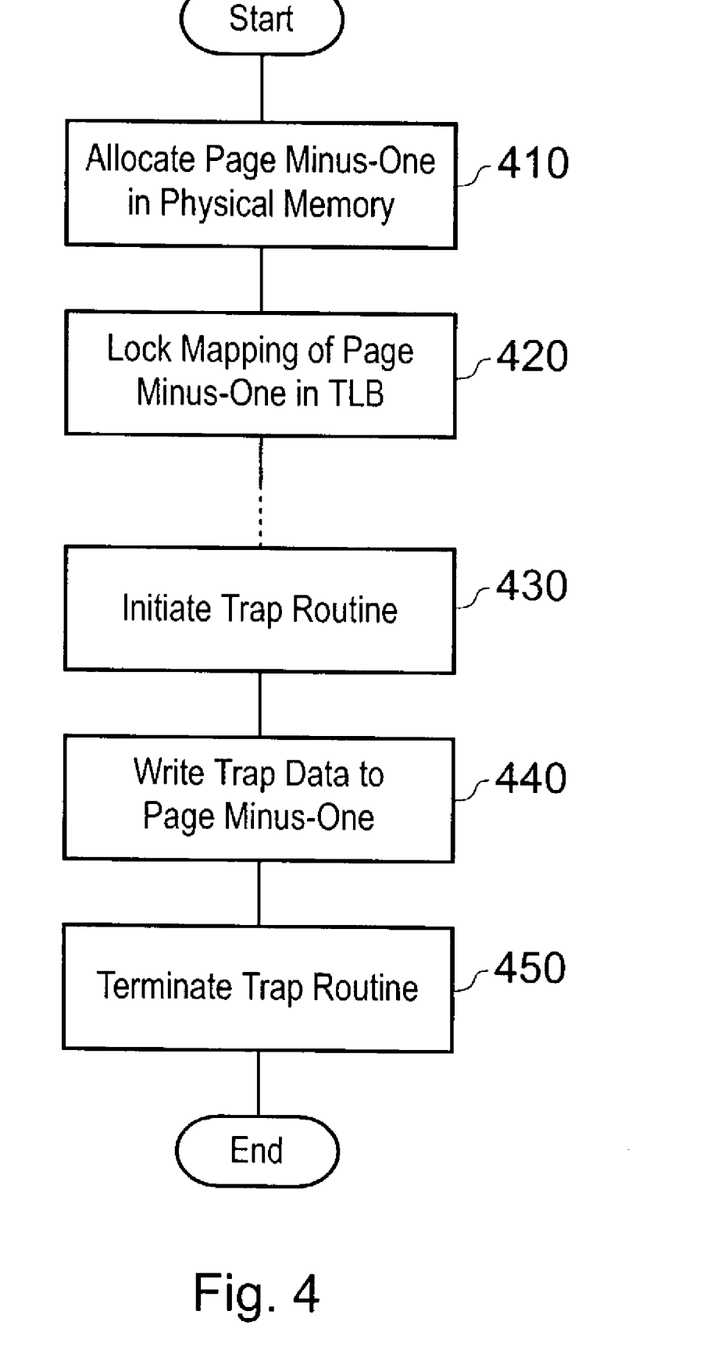
FIG. 4 is a simplified flowchart illustrating operations performed in outputting data from a trap routine in accordance with one embodiment of the present invention.

FIG. 4 illustrates a flowchart depicting the use of page-minus one from within a trap routine. The method commences with the allocation of virtual page minus-one to a portion of physical memory (step 410). Note that in a multiprocessor system such as shown in FIG. 1, the physical address allocated to the scratchpad will vary from one CPU to another (to prevent overwriting).

Next, the mapping to the physical location allocated in step 410 is locked into the translation lookaside buffer (TLB) (step 420). Consequently, the system is always able to convert an address in page minus-one into the appropriate physical address. This avoids the risk that this mapping or allocation is dropped from the TLB, and so won't be available when a trap routine is run.

It will be appreciated that tying up one TLB entry in this manner will have a (small) negative performance impact, since it will slightly reduce the capacity of the TLB available for mainstream program use. It might in theory be possible to avoid such degradation by not locking the address of page minus-one into the TLB, but the consequence of this would be that a TLB miss to page minus-one from a trap routine would then have to invoke the relevant trap routine to reload the mapping into the TLB. The increased complexity caused by such trap routine nesting can make debugging or program analysis more difficult, and increase the risk of errors (or lead the trap routine to fail altogether). Given that trap instrumentation is normally utilised in a debug situation or environment, reliability can be expected to take precedence over performance—hence the presence of locking step 420 in FIG. 4.

Steps 410 and 420 are generally performed at system start-up in order to determine and lock the mapping between page minus-one and physical memory. The method of FIG. 4 now waits an indeterminate period of time (as illustrated by the dashed line) until a trap routine is initiated (step 430). This trap routine is now free to output data to page minus-one (step 440), which will lead to data being stored at the corresponding physical memory location as determined at step 410. Finally the trap routine terminates (step 450), leading to the conclusion of processing in the method of FIG. 4.

Figure 5:
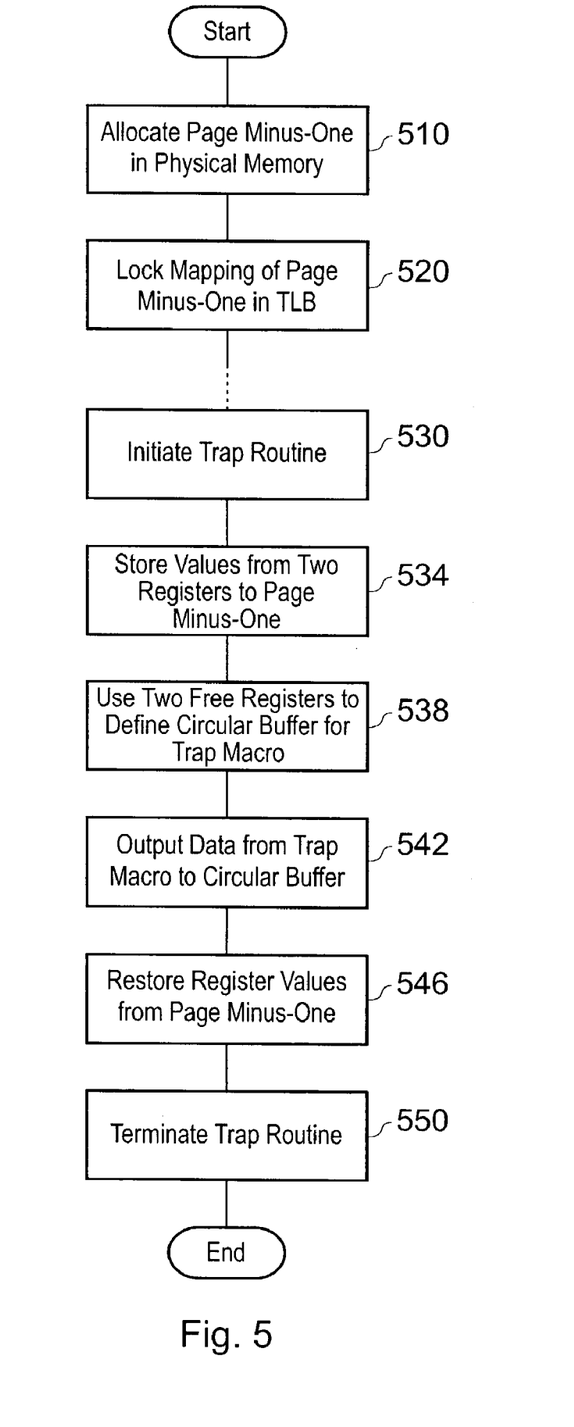
FIG. 5 is a simplified flowchart illustrating operations performed in outputting data from a trap routine in accordance with another embodiment of the present invention.

The approach of FIG. 4 represents perhaps the most straightforward use of the scratchpad of page minus-one. A slightly different approach is illustrated by the flowchart of FIG. 5. One motivation here is to maintain as much as possible compatibility with existing trap routine output macros, which as previously mentioned store their output into a circular buffer.

The processing of FIG. 5 commences in the same fashion as FIG. 4. Thus at start-up, page minus-one is allocated into physical memory (step 510), and the relevant entry is then locked into the TLB (step 520). At some subsequent time, a trap routine is initiated (step 530).

The processing of FIG. 5 now diverges somewhat from that of FIG. 4. At launch of the trap routine, values from two registers (such as G1 and G2 in FIG. 2) are stored into page minus-one (step 534). These two registers are therefore now free to be used to define the circular buffer of an existing trap routine macro (step 538), as previously described. Accordingly, this macro can direct any desired instrumentation output to the circular buffer (step 542).

Once the trap routine has completed its processing, the register values stored in page minus-one can be restored back into the relevant registers (step 546). It will be appreciated that this will then allow processing to continue normally after termination of the trap routine (step 550).

The method of FIG. 5 can be implemented by providing two macros. The first macro, a "start" macro, can be included at the beginning of a trap routine to perform step 534, while a second macro, a "stop" macro, can be included at the end of the trap routine to perform step 546. These two macros therefore represent in effect a wrapper to allow the remainder of the trap routine, including the use of a circular buffer by an instrumentation macro, to remain unchanged, while ensuring that the circular buffer can be safely utilised without risk of losing program state, or of needing to save information out onto the stack.

In one implementation, the circular buffer itself is located in the page minus-one scratchpad (although this does not necessarily have to be so). Thus at CPU start-up, the circular buffer is allocated within the scratchpad, and its "start" and "current" pointer addresses stored at a known location within the scratchpad. (Note that the trap output macro typically uses physical addresses in order to access the circular buffer in order to avoid any traps generated by the physical memory system).

The start macro can then load a free register with the address of the circular buffer using a command such as: ldx [% G0–8], % G1, where G1 is the free register, and the address of the circular buffer is located at "–8" in the address space (corresponding to 0x ffff ffff ffff fff8 in 64-bit space). This corresponds to step 538 in FIG. 5. At the conclusion of the trap routine, the two pointers for the circular buffer (the start and current address) are then saved by the stop macro back to their original locations in the page minus-one scratchpad, immediately prior to restoring the registers to their previous values (step 546). In this manner, a subsequent trap routine can save further data to the appropriate next location in the circular buffer (after calling the start macro).

Note that although the methods of FIGS. 4 and 5 both allocate virtual page-minus one at system boot (start-up), such allocation can also be performed at other times. For example, some kernel debuggers can perform run-time instrumentation of code under scrutiny. These debuggers, having appropriate kernel privileges, can therefore be arranged to create the necessary mapping of page minus-one dynamically. (In this case, the "Start" operations in FIGS. 4 and 5 would then correspond to the start of the debugger, and steps 410/510 to the interaction of the debugger with the kernel memory routines).

The description has so far concentrated on data output for the purposes of trap code instrumentation. However, it will be appreciated that the present invention is not limited just to this context. For example, in a multiprocessor system such as shown in FIG. 1, there can be particular occasions when it is important for a given CPU within a set or cluster of CPUs to know which particular CPU it is. Thus certain system data is stored as a series of records, one per CPU. This data typically includes various system flags, plus information such as the thread id that is running on that particular CPU. Existing systems tend to provide a hardware facility with each CPU to allow the CPU to determine its own identity; this can then be used to calculate the address of the particular status record corresponding to that CPU.

A different approach is based on having a scratchpad at virtual page minus-one for each CPU. Note that since the size of the scratchpad is controlled by the offset permitted in the relevant processor instruction, this will be constant for all processors in the system (although as previously mentioned, page minus-one will correspond to a different actual physical portion of memory for each CPU). The scratchpad at page minus-one provides an alternative mechanism for accessing the CPU-specific data, in that the address of the relevant record can now be stored at a predetermined location within page minus-one. The retrieved address can then be used to directly access the particular status record for that CPU. Note that this record access is achieved with a single instruction, in contrast to the more normal approach that involves a hardware operation followed by a calculation to determine the relevant record. A performance advantage can therefore be expected, although it will be appreciated that this is likely to depend on the particular hardware implementation. In some situations, the performance advantage may more than compensate for the loss of one entry in the TLB (due to locking the mapping of page minus-one). In this case, it is desirable to incorporate the page minus-one scratchpad facility into standard trap processing, rather than just as a form of instrumentation in a debug environment. This is especially likely to be so if the status information is heavily accessed, for example by kernel routines that are called very frequently.

It will be appreciated that in some embodiments the scratchpad may be used to store CPU status information itself (rather than simply a pointer to a record containing this status information). Furthermore, there may be other contexts in which the scratchpad facility may be employed, generally because more normal I/O facilities are not available. These will typically include any situation in which kernel or other low-level code is being processed with a need to output data, but without a free register on which to store the desired address. One qualification on this is that multi-processing systems often actively re-locate code processing from one CPU onto another in order to try to maximise overall system throughput. Since different CPUs use different scratchpads, there is a possibility that this will lead to unanticipated results, where code on one CPU stores data into the scratchpad, and then is unable to retrieve it while running on another CPU. Note that trap routines avoid this problem, since by their very nature they are fixed, in effect, to a single CPU. (Naturally the problem does not arise on a system with only a single CPU).

Although in the embodiments specifically described above the scratchpad is limited to a single page or less, it will be appreciated that this is not necessarily the case. Rather, the scratchpad may instead span more than one page. This situation can arise because the scratchpad size is controlled by the maximum offset permitted by the processor instruction set, for example, 12 bits in the embodiments described above, but this may of course vary from one processor to another. In contrast, the page size is normally governed by the MMU, and in fact may be configurable (at least to some extent) by the user, potentially across different processors within the same multiprocessor system. Consequently, the situation may arise where the offset allowed by the processor is greater than the page size, thereby allowing the scratchpad to span multiple pages.

Nevertheless, it is desirable in general to minimise the number of TLB entries locked by the scratchpad (normally to just one). Thus even if the processor permits larger offsets, the scratchpad may correspond to only a subset of this offset address range, rather than the full offset address range. This subset may potentially be chosen to fall outside page minus-one (in page minus-two, for example), although the adoption of page minus-one for the scratchpad (i.e. starting from a negative offset of zero) is generally the most straightforward.

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. A method for operating a computer system having a memory divided into pages and with an address space starting at zero, the computer system also having a register configured to contain a zero value, said method comprising the steps of:
   allocating a region of memory at the top of said address space;
   locking the allocation of a page or pages corresponding to said region in a translation lookaside buffer; and
   performing a data access from within low-level code running on the computer system to an address in the allocated region of memory, wherein said address is specified as a negative offset from the zero value stored in said register.

2. The method of claim 1, wherein the size of said allocated region of memory is determined by the maximum allowable offset supported by the system for a data access instruction.

3. The method of claim 1, wherein the size of said allocated region of memory is less than the total address space.

4. The method of claim 3, wherein said allocated region of memory is no more than a single page.

5. The method of claim 1, wherein if X is the negative offset, then the specified address corresponds to M+X, where M is the total size of the address space.

6. The method of claim 1, wherein said low-level code comprises a trap routine.

7. The method of claim 6, wherein said data access is performed by a macro incorporated into said trap routine.

8. The method of claim 1, wherein said allocated region is used to save initial values from at least two registers, thereby allowing the at least two registers to be used to define a circular buffer.

9. The method of claim 8, further comprising the steps of saving control information from the circular buffer into the allocated region of memory, and restoring the initial values of said at least two registers from the saved values in the allocated region.

10. The method of claim 1, wherein in a system having multiple CPUs, the allocated region for each CPU is used for storing information particular to that CPU.

11. The method of claim 10, wherein the stored information particular to a CPU comprises an address of a record having status data for that CPU.

12. The method of claim 10, wherein there is one allocated region of memory for each CPU, and the low-level code in performing said data access runs on just one of the CPUs.

13. The method of claim 1, wherein said computer system is a RISC-based system.

14. The method of claim 13, wherein a write address for a store operation is made available to a processor from a register.

15. A computer system having a memory divided into pages and with an address space starting at zero, the computer system also having a register configured to contain a zero value, said computer system further comprising:
   a region of memory at the top of said address space;
   a translation lookaside buffer that supports a lock on an allocation of a page or pages corresponding to said region; and
   low-level code running on the computer system that is operable to perform a data access to an address in the allocated region of memory, wherein said address is specified as a negative offset from the zero value stored in said register.

16. The system of claim 15, wherein the size of said allocated region of memory is determined by the maximum allowable offset supported by the system for a data access instruction.

17. The system of claim 15, wherein the size of said allocated region of memory is less than the total address space.

18. The system of claim 17, wherein said allocated region of memory is no more than a single page.

19. The system of claim 15, wherein if X is the negative offset, then the specified address corresponds to M+X, where M is the total size of the address space.

20. The system of claim 15, wherein said low-level code comprises a trap routine.

21. The system of claim 20, wherein said data access is performed by a macro incorporated into said trap routine.

22. The system of claim 15, wherein said allocated region is used to save initial values from at least two registers, thereby allowing the at least two registers to be used to define a circular buffer.

23. The system of claim 22, wherein control information is saved from the circular buffer into the allocated region of memory, and the initial values of said at least two registers are restored from the saved values in the allocated region.

24. The system of claim 15, wherein said system has multiple CPUs, and the allocated region for each CPU is used for storing information particular to that CPU.

25. The system of claim 24, wherein the stored information particular to a CPU comprises an address of a record having status data for that CPU.

26. The system of claim 24, wherein there is one allocated region of memory for each CPU, and the low-level code in performing said data access runs on just one of the CPUs.

27. The system of claim 15, wherein said computer system is a RISC-based system.

28. The system of claim 27, wherein a write address for a store operation is made available to a processor from a register.

29. A computer program product comprising a medium containing machine readable program instructions for loading into a computer system having a memory divided into pages and with an address space starting at zero, the computer system also having a register configured to contain a zero value, wherein said program instructions cause said computer to perform the steps of:
   allocating a region of memory at the top of said address space;
   locking the allocation of a page or pages corresponding to said region in a translation lookaside buffer; and
   performing a data access from within low-level code running on the computer system to an address in the allocated region of memory, wherein said address is specified as a negative offset from the zero value stored in said register.

30. The computer program product of claim 29, wherein the size of said allocated region of memory is determined by the maximum allowable offset supported by the system for a data access instruction.

31. The computer program product of claim 29, wherein the size of said allocated region of memory is less than the total address space.

32. The computer program product of claim 31, wherein said allocated region of memory is no more than a single page.

33. The computer program product of claim 29, wherein if X is the negative offset, then the specified address corresponds to M+X, where M is the total size of the address space.

34. The computer program product of claim 29, wherein said low-level code comprises a trap routine.

35. The computer program product of claim 34, wherein said data access is performed by a macro incorporated into said trap routine.

36. The computer program product of claim 29, wherein said allocated region is used to save initial values from at least two registers, thereby allowing the at least two registers to be used to define a circular buffer.

37. The computer program product of claim 36, wherein said program instructions further cause the computer system to perform the steps of saving control information from the circular buffer into the allocated region of memory, and restoring the initial values of said at least two registers from the saved values in the allocated region.

38. The computer program product of claim 29, wherein in a system having multiple CPUs, the allocated region for each CPU is used for storing information particular to that CPU.

39. The computer program product of claim 38, wherein the stored information particular to a CPU comprises an address of a record having status data for that CPU.

40. The computer program product of claim 38, wherein there is one allocated region of memory for each CPU, and the low-level code in performing said data access runs on just one of the CPUs.

41. The computer program product of claim 29, wherein said computer system is a RISC-based system.

42. The computer program product of claim 41, wherein a write address for a store operation is made available to a processor from a register.

43. A computer system having a memory divided into pages and with an address space starting at zero, the computer system also having a register configured to contain a zero value, said computer system further comprising:
- means for allocating a region of memory at the top of said address space;
- means for locking the allocation of a page or pages corresponding to said region in a translation lookaside buffer; and
- means for performing a data access from within low-level code running on the computer system to an address in the allocated region of memory, wherein said address is specified as a negative offset from the zero value stored in said register.

44. A computer system having a memory divided into pages and with an address space starting at zero, the computer system also having a register configured to contain a zero value, wherein the computer system is configured to:
- allocate a region of memory at the top of said address space;
- lock the allocation of a page or pages corresponding to said region in a translation lookaside buffer; and
- perform a data access from within low-level code running on the computer system to an address in the allocated region of memory, wherein said address is specified as a negative offset from the zero value stored in said register.

* * * * *